(12) United States Patent
Yoshida (10) Patent No.: US 7,467,602 B2
(45) Date of Patent: Dec. 23, 2008

(54) BREEDING DEVICE FOR LABORATORY ANIMAL

(75) Inventor: Kazuya Yoshida, Saitama (JP)

(73) Assignee: Dai-Dan Co., Ltd., Osaka (JP)

( * ) Notice: Subject to any disclaimer, the term of this patent is extended or adjusted under 35 U.S.C. 154(b) by 172 days.

(21) Appl. No.: 10/589,950

(22) PCT Filed: Feb. 25, 2005

(86) PCT No.: PCT/JP2005/003138

§ 371 (c)(1),
(2), (4) Date: Aug. 18, 2006

(87) PCT Pub. No.: WO2005/082130

PCT Pub. Date: Sep. 9, 2005

(65) Prior Publication Data

US 2007/0186865 A1    Aug. 16, 2007

(30) Foreign Application Priority Data

Feb. 27, 2004    (JP) .............................. 2004-054471

(51) Int. Cl.
*A01K 1/03*    (2006.01)
(52) U.S. Cl. ..................................... 119/419
(58) Field of Classification Search ................ 119/417, 119/418, 419, 420, 448, 455, 457, 493, 500
See application file for complete search history.

(56) References Cited

U.S. PATENT DOCUMENTS

| 4,249,482 A | * | 2/1981 | Harr | ........................... 119/419 |
| 6,743,281 B1 | * | 6/2004 | Miller | .......................... 96/416 |
| 2002/0043217 A1 | * | 4/2002 | Rivard | ........................ 119/419 |

FOREIGN PATENT DOCUMENTS

| JP | 42-21064 | 10/1942 |
| JP | 4-38702 | 9/1992 |
| JP | 2857340 | 11/1998 |
| JP | 2003-180183 | 7/2003 |

* cited by examiner

*Primary Examiner*—Michael R Mansen
*Assistant Examiner*—Monica L Williams
(74) *Attorney, Agent, or Firm*—Clark & Brody (57) ABSTRACT

A laboratory animal breeding device comprises breeding cages, each including a cage body with a part of the cage body being opened and a removable cover for hermetically sealing the opening in the cage body. An air supply device for ventilation inside the breeding cage is attached to the cover of the breeding cage. The breeding cage includes an air exhaust device that is formed of a fan filter unit comprising a fan device and a first filter. The air exhaust device includes an air exhaust opening formed in the breeding cage and a second filter for cleaning air in the breeding cage passing through the air exhaust opening. Outside air is taken into the breeding cage while being cleaned by the fan filter unit, and contaminated air in the breeding cage is exhausted from the air exhaust opening through the second filter to outside of the breeding cage.

5 Claims, 11 Drawing Sheets

BREEDING DEVICE FOR LABORATORY ANIMAL

TECHNICAL FIELD

The present invention relates to a laboratory animal breeding device. In particular, the present invention relates to a laboratory animal breeding device for breeding small laboratory animals such as mice used in development of drugs and in various medical experiments and verifications while carrying out safety management against entry and leakage of bacteria and the like.

BACKGROUND ART

Conventionally, small laboratory animals such as mice, rats, guinea pigs, hamsters, or the like used in various medical experiments and verifications are bred in a laboratory (laboratory animal breeding room) which is well equipped such that sufficient management can be carried out against bacterial infection of the laboratory animals or against leakage of bacteria from the laboratory animals.

In a conventional laboratory animal breeding room, these laboratory animals are bred using a laboratory animal breeding device such that the laboratory animals are protected against microbes such as bacteria or such that leakage of microbes such as bacteria from the laboratory animal breeding room to the outside is prevented. Exemplary conventional laboratory animal breeding devices include device disclosed in Japanese Utility Model Registration No. 2506467 (Patent Document 1).

Figure 12:
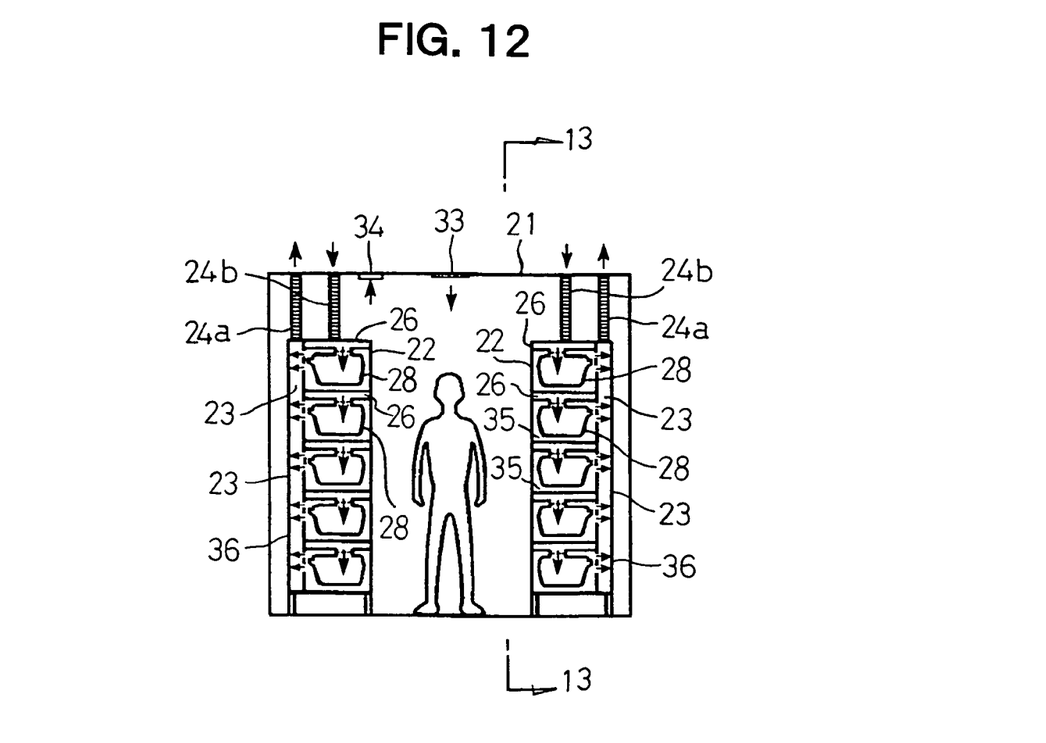
FIG. 12 A structural explanatory view schematically illustrating a laboratory animal breeding room provided with a conventional laboratory animal breeding device.
Figure 13:
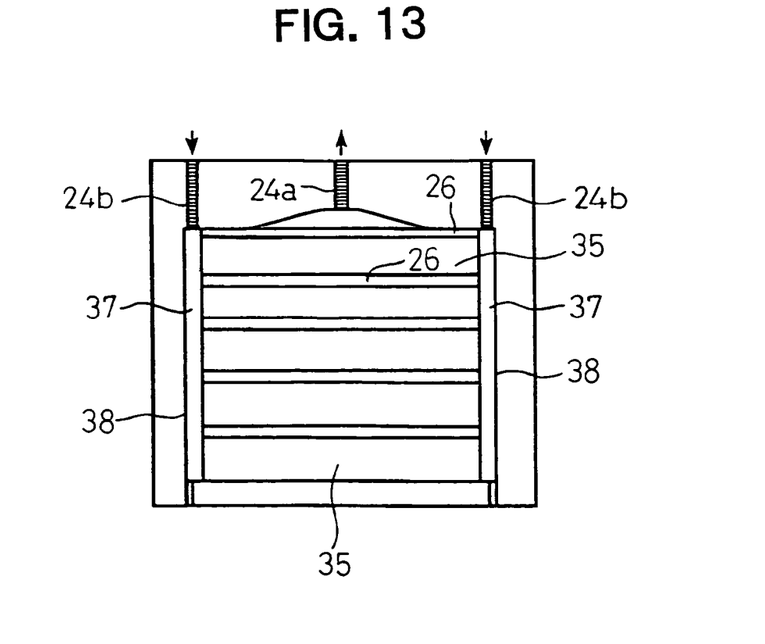
FIG. 13 A structural explanatory view schematically illustrating the conventional laboratory animal breeding room in section taken along the line 13-13 of FIG. 12.
Figure 14:
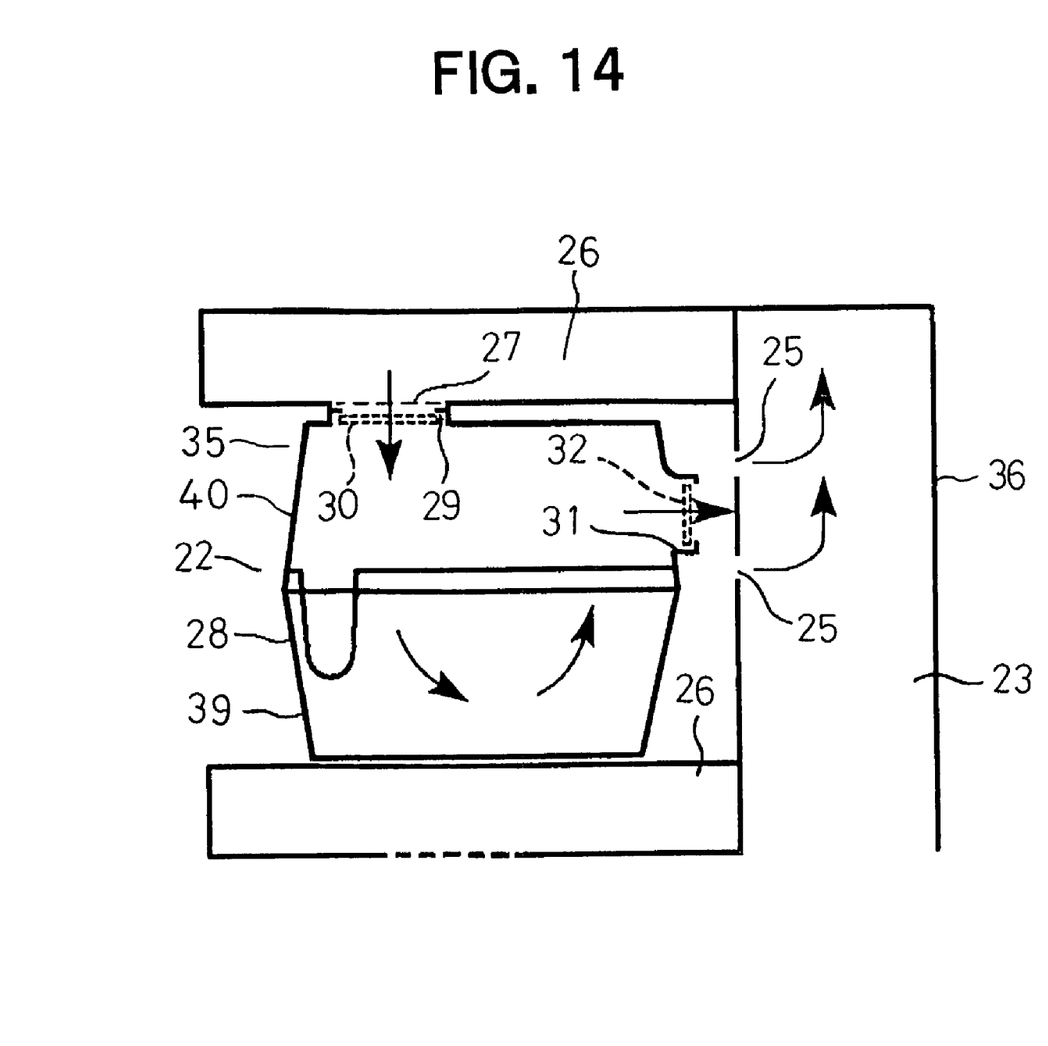
FIG. 14 A schematic longitudinal sectional view illustrating the conventional laboratory animal breeding device where a breeding cage is placed on a rack.

A laboratory animal breeding device disclosed in Patent Document 1 is formed of racks 22 disposed in a laboratory animal breeding room 21 and a plurality of breeding cages 28 mounted on the racks 22, as illustrated in FIGS. 12 to 14.

The rack 22 is provided with a rack body formed by arranging at predetermined intervals in a vertical direction (perpendicular direction) a plurality of shelf boards which extend in a horizontal direction (lateral direction) and supporting the shelf boards by a post. An air exhaust box 36 having an air exhaust chamber 23 formed therein is attached to a rear surface of the rack body so as to be in intimate contact with the rack body. An air supply box 38 having an air supply chamber 37 formed therein is attached to each side surface of the rack body so as to be in intimate contact with the rack body.

Spaces between the respective shelf boards of the rack 22 are cage receiving portions 35 in which a plurality of breeding cages 28 are placed. The plurality of the breeding cages 28 are arranged at substantially predetermined intervals in a lateral direction in each of the cage receiving portions 35. Laboratory animals are bred in the breeding cages 28. A plate which blocks a rear side of the cage receiving portions 35 is a casing plate of the air exhaust box 36 attached to the rear side of the rack body. Exhaust openings 25 are formed in a rear plate of the rack 22 which is formed of the casing plate substantially correspondingly to the locations of the breeding cages 28 placed in the cage receiving portions 35. The cage receiving portions 35 communicate with the air exhaust chamber 23 in the air exhaust box 36 through the respective exhaust openings 25.

Each shelf board is constructed of two partition walls vertically spaced at a predetermined interval and end plates for blocking the whole periphery between the partition walls. An air supply duct 26 is formed inside each shelf board. The air supply duct 26 in each shelf board communicates with the air supply chambers 37 in the air supply boxes 38 placed at both side ends of the rack body. Air outlets 27 the number of which corresponds to that of the breeding cages 28 placed in the cage receiving portions 35 are formed in a bottom surface (partition wall) of an upper shelf board over one cage receiving portion 35. Air supplied from the air supply chamber 37 to the air supply duct 26 blows out from the air outlets 27 toward the cage receiving portions 35. The air exhaust box 36 and the air supply boxes 38 are connected to an air conditioner and an air exhaust device (both not shown) placed outside the laboratory animal breeding room 21 through an air exhaust duct 24a and an air intake duct 24b, respectively.

As illustrated in FIG. 14, each of the breeding cages 28 is constructed of a cage body 39 having a size capable of accommodating a laboratory animal and an upper portion of which is open, and a cover 40 which sealably closes the open upper portion of the cage body 39. An air supply opening 29 is formed in an upper surface of the cover 40 while an air exhaust opening 31 is formed on a rear surface of the cover 40. Filters 30 and 32 are provided in the air supply opening 29 and the air exhaust opening 31, respectively. When each of the breeding cages 28 is placed in the cage receiving portion between the shelf boards, the air supply opening 29 in the upper surface of the cover of the breeding cage 28 is connected to the air outlet 27 formed in the lower surface of the upper shelf board, and clean air supplied to the air supply duct 26 from the air supply chamber 37 is directly supplied to the breeding cage 28 from the air outlet 27.

It is to be noted that ventilation inside the laboratory animal breeding room 21 is provided by a conditioned air outlet 33 for a room and a ventilation opening (air exhaust opening) 34 provided in a ceiling. To be more specific, ventilation inside the laboratory animal breeding room 21 and ventilation inside the respective breeding cages 28 are controlled by separate clean air supply systems. Patent Document 1: Japanese Utility Model Registration No. 2506467

DISCLOSURE OF THE INVENTION

Problem to be Solved by the Invention

In a conventional laboratory animal breeding device, ventilation inside a breeding cage is provided forcedly by a clean air supply system totally different from that used in ventilation inside the laboratory animal breeding room. To be more specific, in the conventional laboratory animal breeding device, air supply ducts 26 are formed in shelf boards of a rack, and ventilation inside breeding cages 28 is provided forcedly by means of directly supplying clean air from the air supply ducts 26 through the air outlets 27 to the respective breeding cages 28. Therefore, ventilation inside the respective breeding cages 28 can be confirmed only when, for example, a ventilation air volume measuring instrument is placed at the air supply openings 29 of the respective breeding cages 28 to detect ventilation. In the conventional laboratory animal breeding device, air is supplied to the breeding cages 28 by an air supply device for each rack or each laboratory animal breeding room. Accordingly, if the air supply device stops for some reason, ventilation inside many breeding cages 28 stops leading to a serious trouble in breeding the laboratory animals. Therefore, it is important to confirm ventilation inside the respective breeding cages 28.

However, placing such ventilation air volume measuring instruments at the air supply openings 29 of the many breeding cages 28 to detect whether ventilation is provided or not requires much effort and cost, which is a cause of increasing the cost necessary for breeding laboratory animals.

Further, in the conventional laboratory animal breeding device, it is difficult to take a breeding cage 28 out of the rack 22 to transfer the breeding cage to some other place, and a laboratory animal in the breeding cage is moved to a special cage to be transferred. The reason is that, if a connection between the air supply opening 29 and the air outlet 27 of the air supply duct 26 is disconnected in order to take the breeding cage 28 out of the rack 22, ventilation inside the breeding cage 28 stops which lead to deterioration of breeding environment inside the breeding cage 28. Therefore, it is desired that the ventilation inside the breeding cage 28 can be continuously maintained even if the breeding cage 28 is taken out of the rack 22.

Further, in the conventional laboratory animal breeding device, since the air supply ducts 26 are formed in shelf boards such that clean air is directly supplied to the respective breeding cages 28 placed on the shelf boards, a structure of the rack 22 is complicated. Further, since the number of the shelf boards forming the rack 22 depends on the height from the floor to the ceiling of the laboratory animal breeding room where the rack 22 is to be installed, it is difficult to increase the number of the shelf boards of the conventional rack 22 which uses thick shelf boards having the air supply ducts 26 formed therein, and thus, there is also a problem in that a density of the placed breeding cages 28 can not be increased.

The present invention is made to solve the problems of the conventional laboratory animal breeding device, and an object of the present invention is to provide a laboratory animal breeding device in which forced ventilation inside a breeding cage can be confirmed, forced ventilation inside a breeding cage can be maintained when the breeding cage is taken out of a breeding rack to transfer the breeding cage, and a lot of breeding cages can be placed on the breeding rack by constructing barriers against entry and leakage of bacteria for the respective breeding cages.

Means for Solving the Problem

A premise of the present invention in order to solve the above problem is a laboratory animal breeding device including a breeding cage, the breeding cage including a cage body a part of which is opened and a removable cover for sealing the opening in the cage body.

According to the premise, a laboratory animal breeding device including breeding cages, each of the breeding cages including a cage body a part of the cage body being opened and a removable cover for hermetically sealing the opening in the cage body, is characterized in that: an air supply device for ventilation inside the breeding cage is attached to the cover of the breeding cage, the breeding cage comprises an air exhaust device, the air supply device being formed of a fan filter unit comprising a fan device and a first filter, and the air exhaust device being formed of an air exhaust opening formed in the breeding cage and a second filter for cleaning air in the breeding cage passing through the air exhaust opening; and air outside the breeding cage is taken into the breeding cage while being cleaned by the fan filter unit, and contaminated air in the breeding cage is exhausted from the air exhaust opening through the second filter to outside of the breeding cage.

(1) According to an example of an embodiment of a laboratory animal breeding device of the present invention, the laboratory animal breeding device further includes breeding racks, each of the breeding rack includes a rack body having a plurality of horizontally extending shelf boards, the shelf boards are vertically arranged at predetermined intervals, a space between the shelfboards forming a cage receiving portion, and the breeding cage is placed in the cage receiving portion.

(2) According to another example of the embodiment of a laboratory animal breeding device of the present invention, the breeding rack includes an air exhaust box attached to a rear surface of the rack body, the air exhaust box has an air exhaust chamber formed therein, the air exhaust box has an exhaust opening communicating with the cage receiving portion, and the contaminated air in the breeding cage exhausted from the air exhaust opening of the breeding cage to the cage receiving portion is exhausted from the exhaust opening into the air exhaust chamber.

(3) According to further another example of the embodiment of a laboratory animal breeding device of the present invention, the air supply device is removably attached to the cover of the breeding cage.

(4) According to still another example of the embodiment of a laboratory animal breeding device of the present invention, the air supply device is removably attached to the shelf board of the breeding rack.

(5) According to yet another example of the embodiment of a laboratory animal breeding device of the present invention, the laboratory animal breeding device further includes a state monitoring device for displaying a state of operation of the fan filter unit for supplying air to the breeding cage.

(6) According to further another example of the embodiment of a laboratory animal breeding device of the present invention, the state monitoring device is a display portion attached to an outer surface of the fan filter unit.

(7) According to still another example of the embodiment of a laboratory animal breeding device of the present invention, the breeding rack includes an electric power supply terminal for supplying driving electric power to the fan filter unit of the breeding cage placed in the cage receiving portion and a communication unit for transmitting the state of operation of the fan filter unit, the breeding cage includes a terminal and an interface connectable to the electric power supply terminal and the communication unit, respectively, and by placing the breeding cage in the cage receiving portion of the breeding rack, the terminal of the breeding cage is connected to the electric power supply terminal and the interface of the breeding cage can be electrically connected to the communication unit.

Effect of the Invention

With a laboratory animal breeding device according to the present invention, an air supply device constructed of a fan filter unit attached to a cover of a breeding cage takes air from the outside of the breeding cage and cleans the air, so whether ventilation inside the breeding cage is provided or not can be easily confirmed only by monitoring the operation of the air supply device. To be more specific, with the laboratory animal breeding device according to the present invention, whether ventilation inside the breeding cage is provided or not can be confirmed without fail by monitoring the state of operation of the fan filter unit or the state of clogging of the filter.

Further, with the laboratory animal breeding device according to the present invention, the air supply device formed of the fan filter unit is attached to each breeding cage, so even in a case where the breeding cage is taken out of a breeding rack to transfer the breeding cage to some other place, if the transfer device is equipped with a battery, electric power can be supplied by electrically connecting the battery with the fan filter unit of the breeding cage. Further, since air is taken in by the fan filter unit from the outside of the breeding cage while being cleaned and air in the breeding cage is exhausted from an air exhaust opening through a second filter, ventilation inside the breeding cage can be maintained even during the breeding cage is transferred.

Further, with the laboratory animal breeding device according to the present invention, the laboratory animal breeding device is provided with a display portion for displaying the state of operation of the fan filter unit on an outer surface of the unit attached to the cover of each breeding cage, the state of operation of the fan filter unit, in other words, the state of ventilation inside the breeding cage can be confirmed at once.

Still further, with the laboratory animal breeding device according to the present invention, unlike in the case of the conventional device, air supply ducts are not formed in shelf boards of the breeding rack, so thin shelf boards can be used, thereby making it possible to increase the number of the shelf boards, which can increase the density of the breeding cages received on the rack.

Still further, with the laboratory animal breeding device according to the present invention, ventilation inside the breeding cages is provided with regard to individual breeding cages, so even if ventilation trouble is caused in one breeding cage, ventilation inside other breeding cages is not affected, and thus, breeding environment of laboratory animals in other breeding cages is not changed. To be more specific, with the conventional laboratory animal breeding device, since clean air is distributed to all the breeding cages by a single ventilation system, if trouble is caused in the ventilation system and the ventilation system stops even temporarily, breeding environment inside all the breeding cages becomes abnormal, the lives of many laboratory animals are threatened, and a serious loss is sustained. On the other hand, with the laboratory animal breeding device according to the present invention, ventilation is provided with regard to individual breeding cages, so such risk can be spread.

DESCRIPTION OF REFERENCE NUMERALS 1 laboratory animal breeding room
2 indoor air outlet for air conditioning
3 air conditioner
4 air exhaust chamber
5 breeding rack
6 air exhaust duct
7 air exhaust fan
8 breeding cage
9 exhaust opening
10 power supply
11 information processor
12 cover
13 fan filter unit
14 air exhaust device
15 second filter
16 shelf board
17 air supply device
18 cage receiving portion
19 air exhaust box
20 laboratory animal breeding device
132 first filter

BEST MODE FOR CARRYING OUT THE INVENTION

A laboratory animal breeding device according to the present invention is described in detail in the following with reference to attached drawings.

Figure 1:
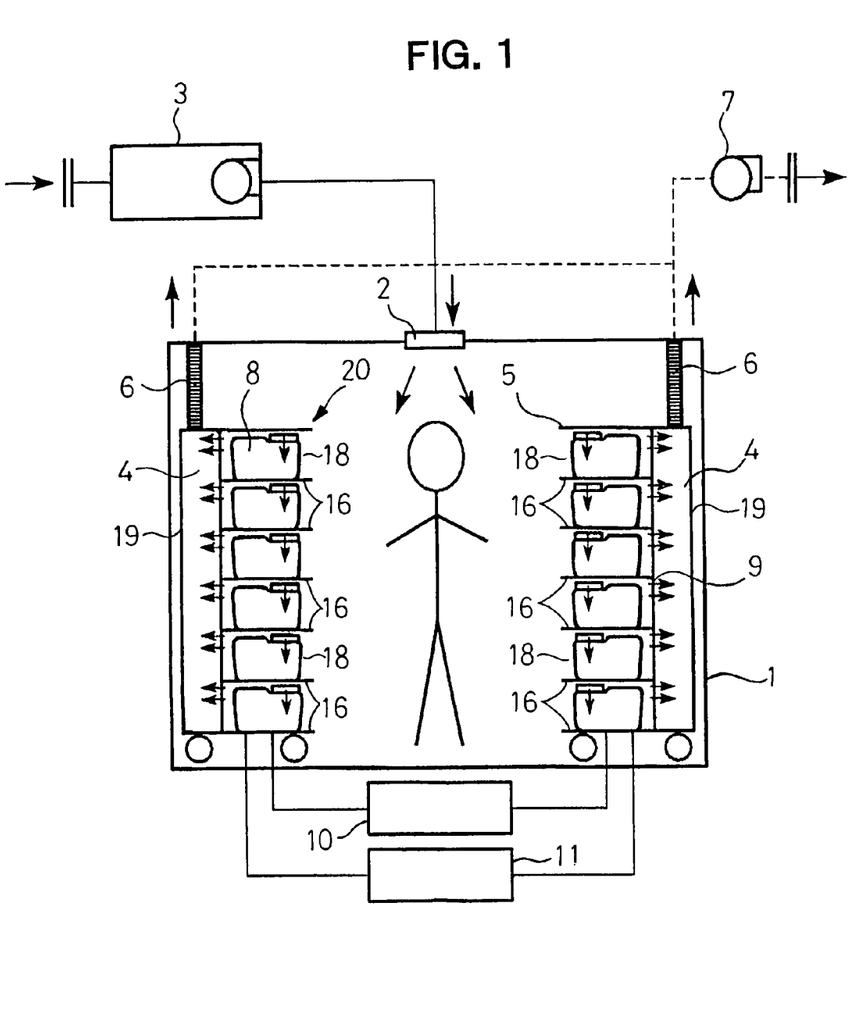
FIG. 1 A structural explanatory view schematically illustrating a laboratory animal breeding room provided with a laboratory animal breeding device according to an embodiment of the present invention.
Figure 2:
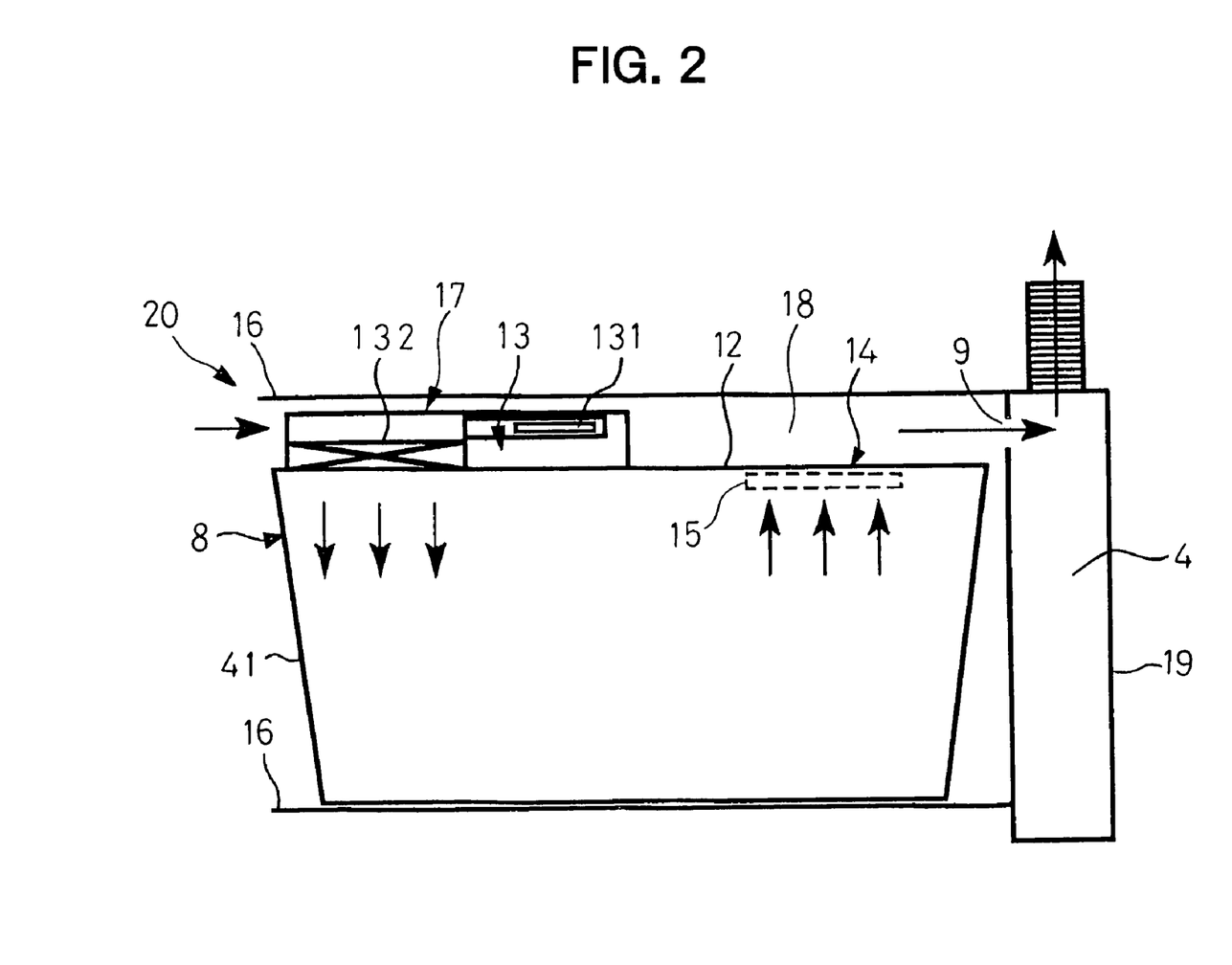
FIG. 2 A longitudinal sectional view schematically illustrating a single breeding cage placed on a breeding rack.

FIG. 1 is a structure explanatory view schematically illustrating a laboratory animal breeding room provided with a laboratory animal breeding device 20 according to an embodiment of the present invention. FIG. 2 is a schematic longitudinal sectional view illustrating a breeding cage 8 placed on a breeding rack 5 of the laboratory animal breeding device 20 illustrated in FIG. 1. The laboratory animal breeding device 20 according to the present invention is placed in a laboratory animal breeding room 1. A person who has responsibility in breeding laboratory animals ordinarily conducts operation of breeding in the laboratory animal breeding room 1. An indoor air outlet 2 for air conditioning is provided in a ceiling of the laboratory animal breeding room 1. Clean air having controlled temperature and humidity after temperature and humidity thereof are adjusted and dust is filtered out therefrom by an air conditioner 3 installed outside the room is supplied from the indoor air outlet 2.

The laboratory animal breeding device 20 includes the breeding cage 8 and an air supply device 17 and an air exhaust device 14 attached to the breeding cage 8. When the breeding cages 8 are placed in the laboratory animal breeding room 1 to breed laboratory animals, the laboratory animal breeding device 20 also includes a breeding rack 5 which can hold many breeding cages 8. The breeding rack 5 is provided with a rack body formed by placing a plurality of shelf boards 16 which extend in a horizontal direction (lateral direction) at predetermined intervals in a vertical direction (perpendicular direction), and supporting the shelf boards 16 by a post. An air exhaust box 19 having an air exhaust chamber 4 formed therein is attached to a rear surface of the rack body so as to be in intimate contact with the rack body.

Spaces between the respective shelf boards 16 of the breeding rack 5 are cage receiving portions 18 in which a plurality of the breeding cages 8 are placed. A plurality of the breeding cages 8 are placed at substantially predetermined intervals in a lateral direction in each of the cage receiving portions 18 (see also FIG. 5). Laboratory animals are bred in the breeding cages 8. A plate which blocks a rear side of the cage receiving portions 18 is a casing plate of the air exhaust box 19 attached to the rear side of the rack body. Exhaust openings 9 are formed in the rear plate of the breeding rack 5 which is the casing plate substantially corresponding to the locations of the respective breeding cages 8 placed in the cage receiving portions 18. The respective cage receiving portions 18 communicate with the air exhaust chamber 4 in the air exhaust box 19 through the respective exhaust openings 9. The air exhaust box 19 is connected through an air exhaust duct 6 to an air exhaust fan 7 installed outside the room. Air exhausted into the air exhaust chamber 4 in the air exhaust box 19 is exhausted to the outside of the laboratory animal breeding room 1 by the air exhaust fan 7.

The breeding cage 8 is formed of a cage body 41 whose upper portion is open and a cover 12 removably provided so as to close the upper surface of the cage body 41. The breeding cage 8 may be formed of a synthetic resin material or the like. The air supply device 17 and the air exhaust device 14 for ventilation inside the breeding cage 8 are provided in an upper surface of the cover 12 of the breeding cage 8. The air supply device 17 is formed of a fan filter unit 13 provided with a fan device 131 and a first filter 132 being a HEPA filter.

Figure 3:
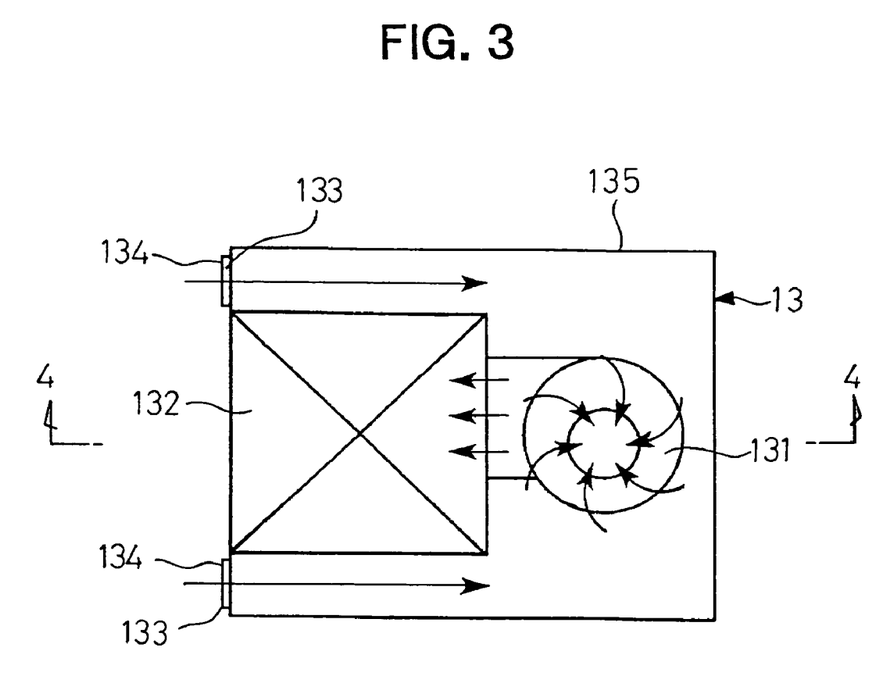
FIG. 3 A transverse sectional view schematically illustrating inside of a fan filter unit.
Figure 4:
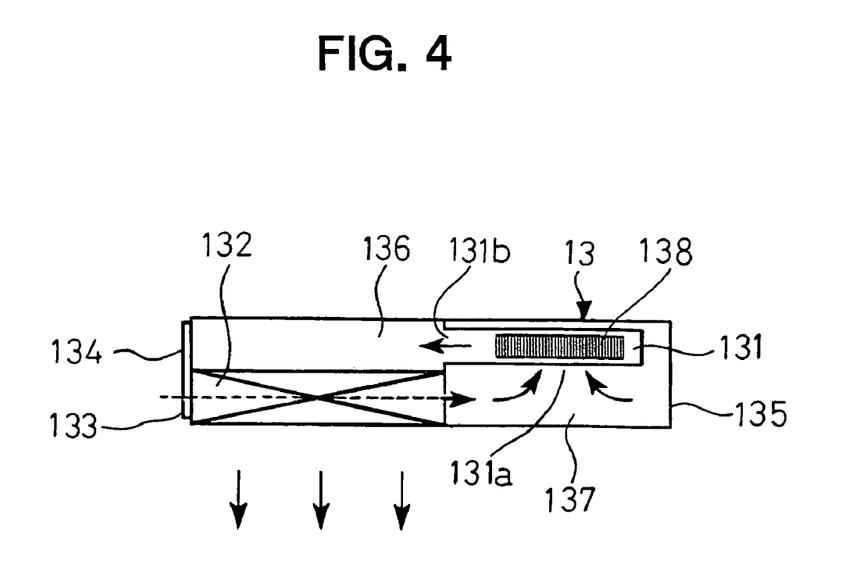
FIG. 4 A sectional view taken along the line 4-4 of FIG. 3 schematically illustrating the fan filter unit.

The structure of the fan filter unit 13 is schematically illustrated in FIGS. 3 and 4. The fan filter unit 13 is provided with a fan filter unit body 135 being a thin sealed box. Assuming that a left side of the fan filter unit body 135 in FIGS. 3 and 4 is a front surface, the first filter 132 is disposed in the fan filter unit body 135 so as to cover an opening formed in a bottom plate on a front side of the unit body 135. Further, in the fan filter unit body 135, spaces are formed over, on both sides thereof, and at the back (on a rear side of the breeding rack) of the first filter 132. Among these spaces, the spaces formed on both sides of and at the back of the first filter 132 are defined by partition plates which are in intimate contact with both side surfaces and a rear surface of the first filter 132 and which are impervious to air, and inner wall surfaces of the fan filter unit body 135. A sealed space 136 formed over the first filter 132 is defined by an upper surface of the first filter 132 itself and the inner wall surfaces of the fan filter unit body 135. The sealed space 136 communicates with the inside of the cage body 41 through the first filter 132, and communicates with the space formed at the back of the first filter 132 through the fan device 131. The fan device 131 is installed in the fan filter unit body 135 over the space formed at the back of the first filter 132. In the fan filter unit body 135 in the embodiment illustrated in FIGS. 3 and 4, a centrifugal fan (sirocco fan) 138 is used as a fan for the fan device 131.

The fan device 131 is provided with an intake portion 131a for taking air into a fan body and an air blow portion 131b for supplying air from the fan body. The air blow portion 131b of the fan device 131 communicates only with the sealed space 136 defined over the first filter 132. The intake portion 131a of the fan device 131 communicates with a space 137 under the fan device 131. The spaces on both sides of the first filter 132 are passageways for introducing air into the unit body 135. Air intake openings 134 (see also FIG. 5) which communicate with the outside of the fan filter unit body 135 are formed on front sides of the passageways. Prefilters 133 are attached to the air intake openings 134. The passageways formed on both sides of the first filter 132 communicate with the space 137 under the fan device 131.

The upper surface of the cover 12 of the breeding cage 8 has an opening formed therein in a range which opposes a surface of the first filter 132 through which air passes. The fan filter unit 13 is removably disposed on the upper surface of the cover 12 such that the opening in the upper surface of the cover opposes the surface of the first filter 132 through which air passes.

When the fan device 131 of the fan filter unit 13 is driven, air in the laboratory animal breeding room 1 is introduced from each air intake opening 134 through the prefilter 133 into the fan filter unit body 135, and taken into the fan body from the intake portion 131a of the fan device 131. Air which is blown out from the air blow portion 131b of the fan device 131 is cleaned through the first filter 132 to be supplied to the cage body 41 down below. In FIGS. 1 to 4, arrows designate the direction of airflow when the fan device 131 is operated.

The fan filter unit 13 is attached to the cover 12 of the breeding cage 8 so as to be easily removable. The first filter 132 is attached to the fan filter unit 13 such that the first filter 132 alone is easily removable from the fan filter unit 13. Therefore, an operator can save time and trouble in cleaning the cage body 41 and replacing the filter, and maintenance can be performed with efficiency. It is to be noted that, although a case where a centrifugal fan is used as the fan device of the fan filter unit 13 in the laboratory animal breeding device 20 in this embodiment is described, the present invention is not limited thereto, and other fans including a multiblade fan and an axial fan to be described in the following may also be used.

On the other hand, the air exhaust device 14 is formed of an air exhaust opening formed in the upper surface of the cover 12 and a second filter 15 attached so as to cover the air exhaust opening. Therefore, air in the breeding cage 8 is exhausted while being cleaned through the second filter 15 provided at the air exhaust opening in the upper surface of the cover 12. In an operating state where the breeding cage 8 is placed in the cage receiving portion 18 of the breeding rack 5, air in the breeding cage 8 is exhausted from the air exhaust device 14 to the cage receiving portion 18, from the cage receiving portion 18 to the rear plate of the breeding rack 5, and through the exhaust opening 9 formed substantially correspondingly to the location of the breeding cage 8 into the air exhaust chamber 4. In other words, air in the breeding cage 8 is exhausted from the air exhaust device 14 through the cage receiving portion 18 and indirectly into the air exhaust chamber 4.

The reason that the air exhaust device 14 for ventilation inside the breeding cage 8 is formed in the upper surface of the cover 12 is, since the exhaust opening 9 of the air exhaust chamber 4 is formed in the rear plate of the breeding rack 5 substantially correspondingly to the location of the breeding cage 8, that negative pressure caused by air which flows toward the exhaust opening 9 should be prevented from reaching the inside of the breeding cage 8 through the air exhaust device 14 as a result of too small distance between the air exhaust device 14 of the breeding cage 8 and the exhaust opening 9.

To be more specific, the reason is that, when a system for supplying air into the laboratory animal breeding room 1 stops due to some abnormality and only an air exhaust system operates normally, the possibility that negative pressure caused by exhaust air which is applied to the respective cage receiving portions 18 will directly reach the inside of the breeding cages 8 through the air exhaust devices 14 should be avoided. Since an object of the laboratory animal breeding device 20 is to construct barriers with regard to the respective breeding cages, negative pressure inside the breeding cages should be avoided. Therefore, the air exhaust devices 14 of the breeding cages 8 and the exhaust openings 9 in the air exhaust chamber 4 are disposed so as not to be close to each other with a sufficient distance therebetween, such that negative pressure caused by exhaust air which is applied to the respective cage receiving portions 18 does not directly affect the inside of the breeding cages 8.

Further, in the laboratory animal breeding device 20 according to the present invention, since the air exhaust devices 14 of the breeding cages 8 and the exhaust openings 9 in the air exhaust chamber 4 are not disposed to be close to each other with a sufficient distance therebetween, even when air flows back from the exhaust openings 9 in the air exhaust chamber 4, the airflow does not directly reach the air exhaust devices 14 of the breeding cages 8.

In the laboratory animal breeding device 20 according to this embodiment, each of the breeding cages 8 is provided with the air supply device 17 formed of the fan filter unit 13 having the fan device 131 and the first filter 132 and the air exhaust device 14 having the second filter 15. Since air from the outside is cleaned and taken into the breeding cage 8 by the fan filter unit 13 and air in the breeding cage 8 is exhausted from the breeding cage 8 through the second filter 15, the barriers can be constructed with regard to the respective breeding cages. Further, since the barriers can be constructed with regard to the respective breeding cages, the breeding cage 8 can be transferred while continuing ventilation inside the breeding cage 8 maintained.

Unlike a rack in a conventional laboratory animal breeding device, shelf boards are not required to have air supply ducts provided therein, and as a result, the structure of the breeding rack 5 can be simplified. Further, in this embodiment, since the fan device 131 of the filter fan unit 13 is installed such that the rotation axis of the fan extends in a vertical direction, the filter fan unit can be made thin. As a result, the intervals between the shelf boards 16 in the breeding rack 5 can be made smaller than those in a conventional rack, and thus, the number of the cage receiving portions 18 can be increased and the density of the breeding cages held can be increased.

Figure 5:
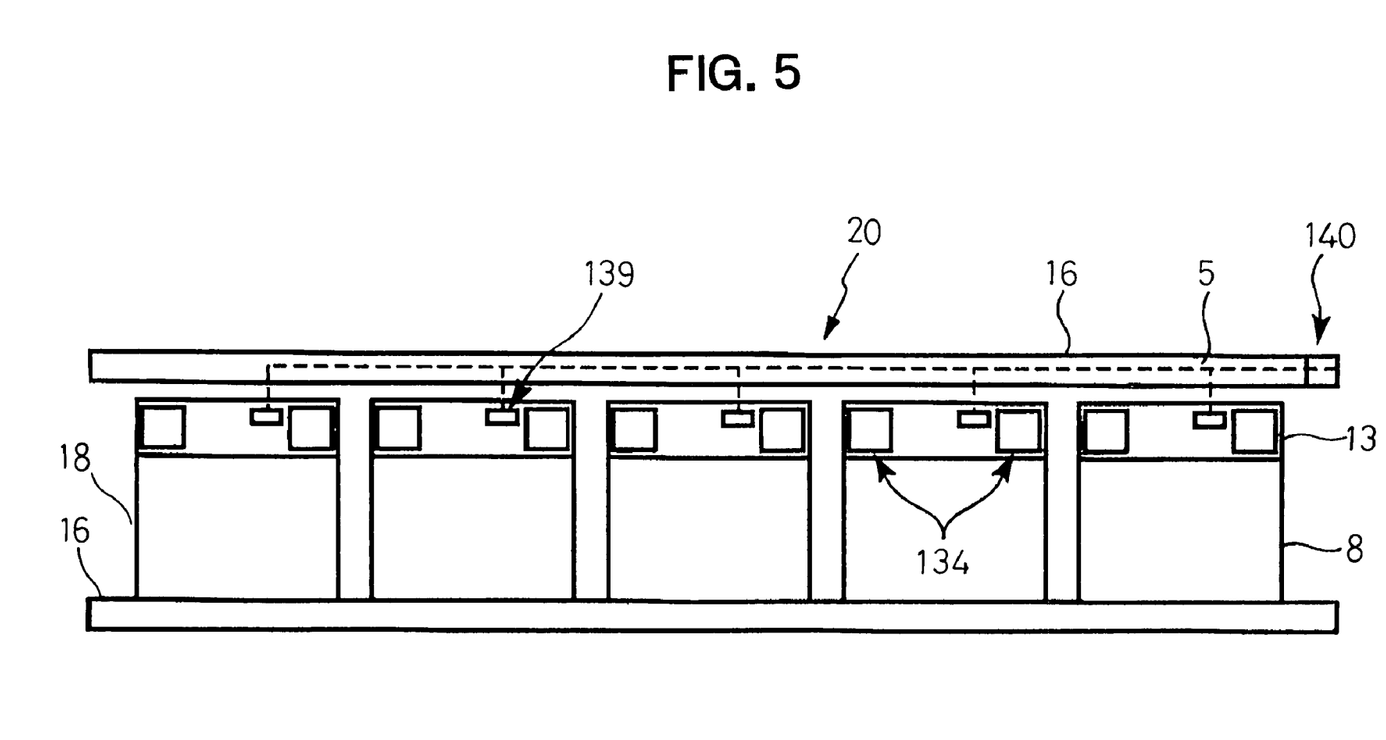
FIG. 5 A structural explanatory view viewed from front of a part of a breeding rack in which a plurality of breeding cages of a laboratory animal breeding device according to another embodiment of the present invention are placed in a single cage receiving portion.

FIG. 5 is a front view illustrating a laboratory animal breeding device 20 according to another embodiment of the present invention. In the laboratory animal breeding device 20 according to this embodiment, a breeding rack 5 is provided with an electric power supply terminal for supplying electric power to a fan filter unit 13 over a breeding cage 8 placed in a cage receiving portion 18. The electric power supply terminal is connected to a power supply 10 outside the room through an electric power supply line which passes through a wiring duct 140 provided in the breeding rack 5. Further, the breeding rack 5 is provided with a terminal for communication for transmitting information of monitored state of ventilation inside the breeding cage 8. The terminal for communication is also electrically connected to an information processor 11 such as a computer installed outside the room through a communication line which passes through the wiring duct 140. On the other hand, a wire communication interface 139 is attached to an outer surface on a front surface side of the filter fan unit 13 disposed over the breeding cage 8.

When the breeding cage 8 is placed in the cage receiving portion 18 of the breeding rack 5, the wire communication interface 139 attached to the fan filter unit 13 is connected to the electric power supply terminal and the terminal for communication provided in the breeding rack 5. As a result, the fan filter unit 13 of the breeding cage 8 is driven by the driving electric power supplied by the power supply 10, and the state of operation of the fan filter unit 13 is transmitted by wire communication to the information processor 11. The information processor 11 displays the state of operation of the fan filter unit 13, for example, whether the fan filter unit 13 is operating or not, and the result of detection of, for example, pressure difference between the inside and the outside the breeding cage 8. This allows monitoring of the state of environment inside the breeding cage.

Figure 6:
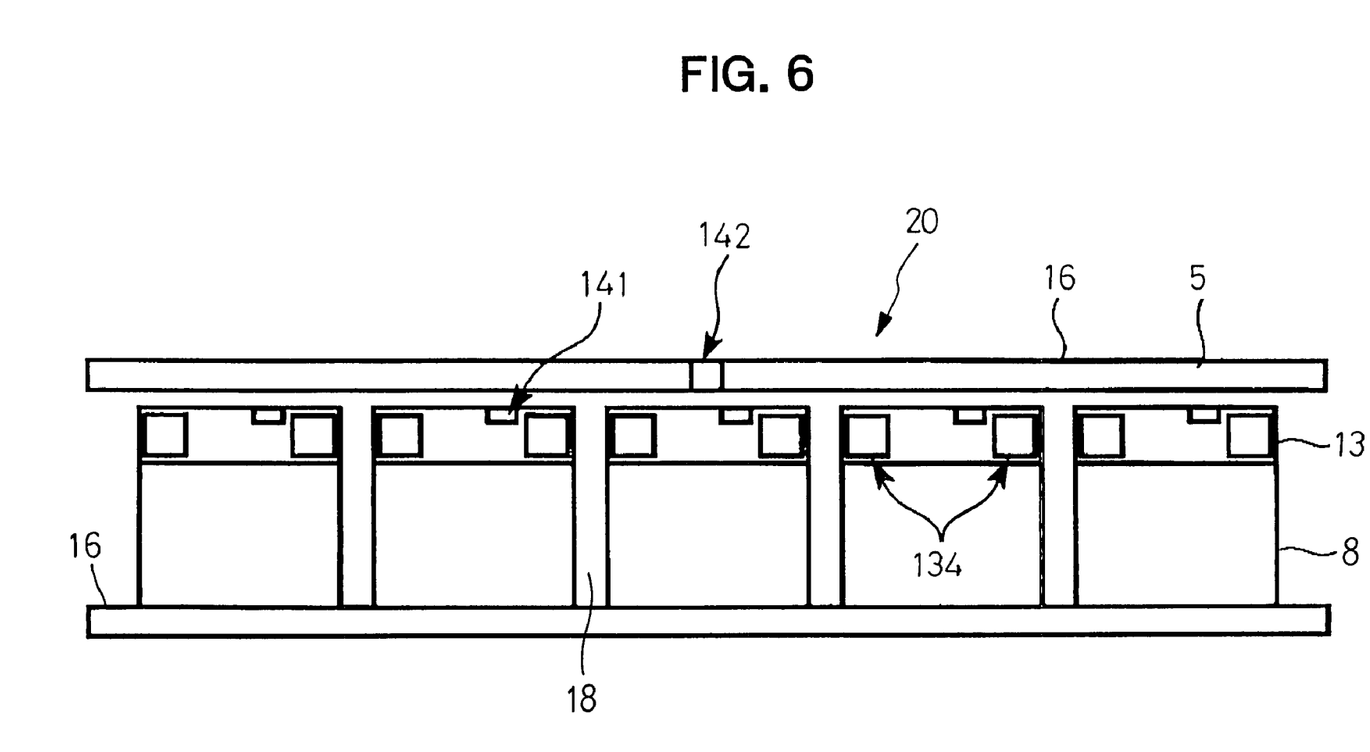
FIG. 6 A structural explanatory view viewed from the front of a part of a breeding rack in which a plurality of breeding cages of a laboratory animal breeding device according to still another embodiment of the present invention are placed in a single cage receiving portion.

FIG. 6 is a front view illustrating a laboratory animal breeding device 20 according to still another embodiment of the present invention. In the laboratory animal breeding device 20 according to this embodiment, a breeding rack 5 is provided with a wireless communication unit 142. The wireless communication unit 142 transmits information of operation of a fan filter unit 13 over a breeding cage 8 placed in a cage receiving portion 18 to an information processor 11 installed outside the room. To be more specific, the breeding cage 8 is provided with a wireless communication interface 141 which is attached to an outer surface on a front surface side of the filter fan unit 13 disposed over the breeding cage 8.

When the breeding cage 8 is placed in the cage receiving portion 18 of the breeding rack 5, wireless communication is established between the wireless communication interface 141 attached to the fan filter unit 13 and a wireless communication unit 142 provided in the breeding rack 5. Further, the wireless communication unit 142 is connected to the information processor 11 installed outside a laboratory animal breeding room 1 through wireless communication or wire communication. As a result, information can be outputted from the fan filter unit 13 to the information processor 11 installed outside the laboratory animal breeding room 1. This allows transmission of information of the state of operation of the fan filter unit 13 to the information processor 11 through wireless communication. The information processor 11 displays the state of operation of the fan filter unit 13 and the result of detection of, for example, pressure difference between the inside and the outside of the breeding cage 8. This allows monitoring of the state of environment inside the breeding cage from the outside of the laboratory animal breeding room 1. It is to be noted that, in the laboratory animal breeding device 20 according to this embodiment, a power supply connection terminal (not shown) is provided on a rear surface of the fan filter unit 13. The power supply connection terminal is connected to an electric power supply terminal disposed at an appropriate place in the breeding rack 5 when the fan filter unit 13 is placed in the cage receiving portion 18 together with the breeding cage 8.

Figure 7:
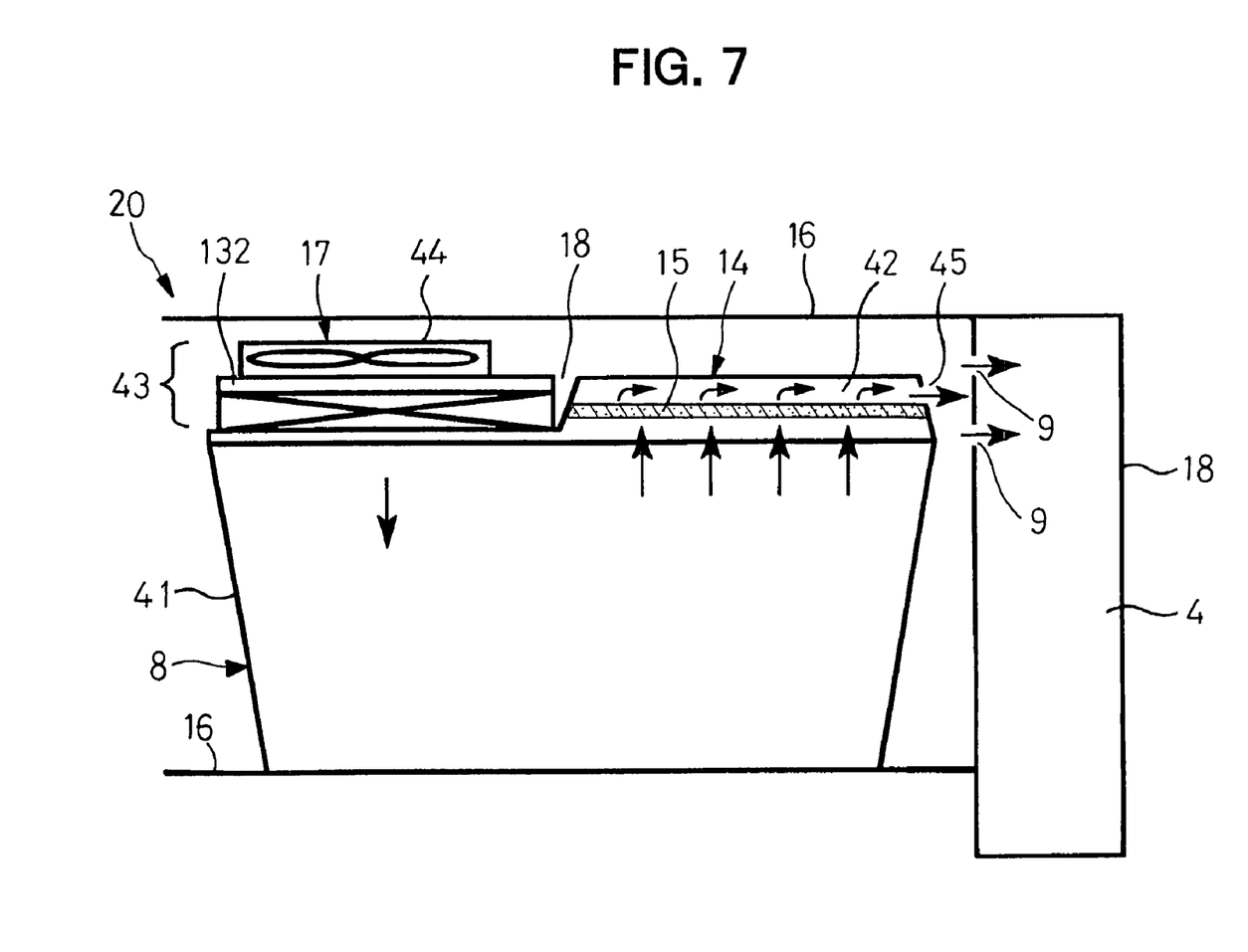
FIG. 7 A schematic longitudinal sectional view similar to FIG. 2 illustrating another exemplary breeding cage placed on a breeding rack.

FIG. 7 is a schematic longitudinal sectional view similar to FIG. 2 illustrating a breeding cage 8 forming a laboratory animal breeding device 20 according to another embodiment of the present invention, which is placed in a cage receiving portion 18 on a breeding rack 5. The breeding cage 8 is provided with a cage body 41 and a cover 42. Similar to the case of the laboratory animal breeding device 20 illustrated in FIG. 2, the cover 42 of the breeding cage 8 is provided with an air supply device 17 and an air exhaust device 14 is formed in the cover 42.

The air supply device 17 is formed of a fan filter unit 43, including a first filter 132 being a HEPA filter and an axial fan 44 disposed over the first filter 132. The air exhaust device 14 formed in the cover 42 is formed of an air exhaust opening 45 and a second filter 15. The air exhaust opening 45 is formed on a side which faces an air exhaust box 19 provided on a rear side of the breeding rack 5 when the breeding cage 8 is placed in the cage receiving portion 18 of the breeding rack 5. The second filter 15 is disposed in a path where air inside the breeding cage 8 flows toward the air exhaust opening 45. It is to be noted that, also in the laboratory animal breeding device 20 of this embodiment, the air exhaust opening 45 is formed at a place where the air exhaust opening 45 does not oppose the exhaust opening 9 formed in a rear plate of the breeding rack 5 such that the distance between the air exhaust opening 45 and the exhaust opening 9 is not too small.

Figure 8:
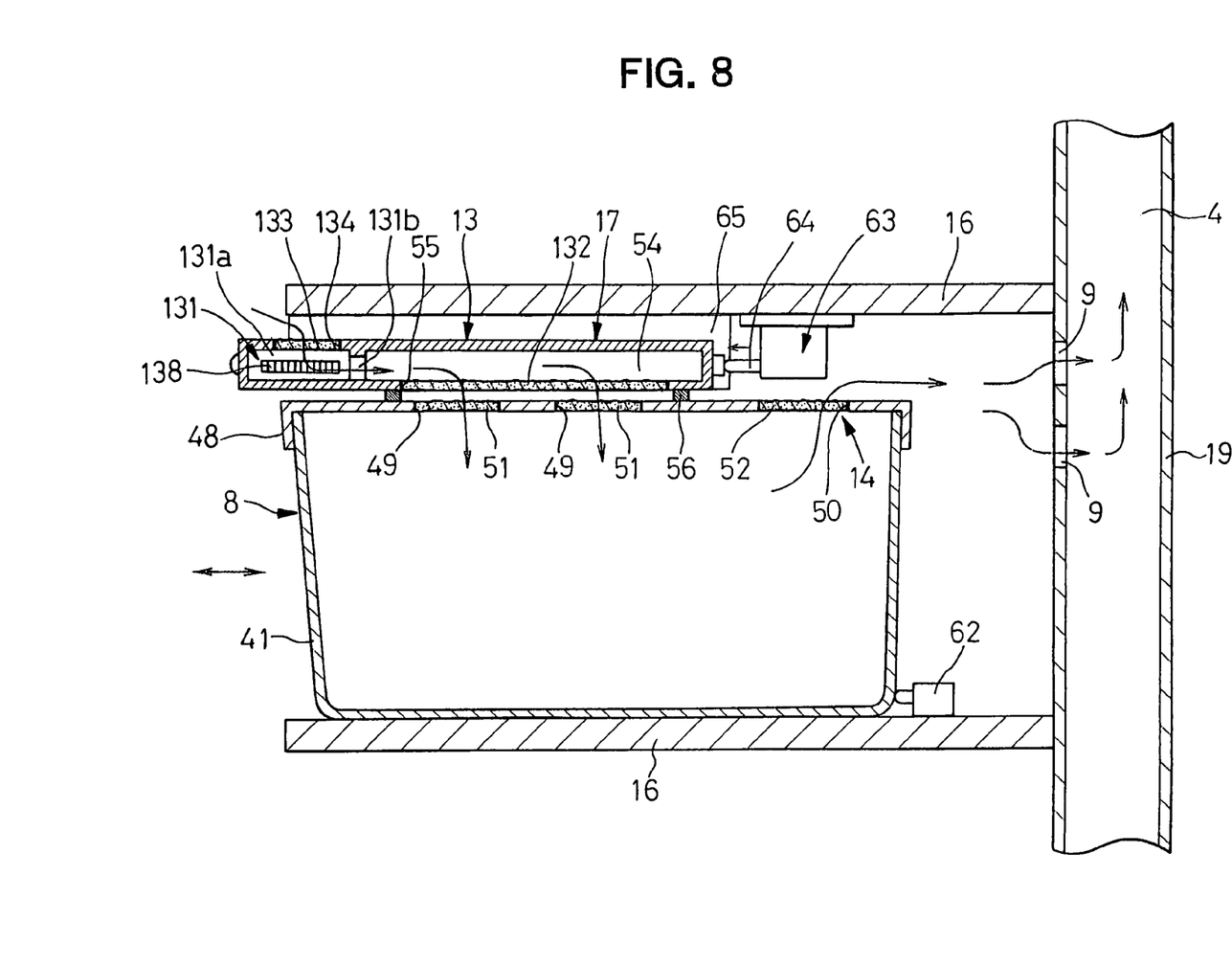
FIG. 8 A schematic longitudinal sectional view illustrating a breeding cage of a laboratory animal breeding device according to yet another embodiment of the present invention placed on a breeding rack.

FIGS. 8 to 11 illustrate a laboratory animal breeding device 20 according to still another embodiment of the present invention. The laboratory animal breeding device 20 according to this embodiment includes the breeding cage 8 which is formed of a cage body 41 whose upper portion is open and a cover 48 which removably seals the upper opening of the cage body 41. FIG. 8 is a schematic longitudinal sectional view similar to FIG. 2 illustrating the breeding cage 8 and the air supply device 17 disposed over the breeding cage 8 placed in a cage receiving portion 18 of a breeding rack 5. An air supply opening 49 for taking in air is formed in an upper surface of the cover 48 of the breeding cage 8 on a front side of the breeding rack 5 (a left side in FIG. 8) while an air exhaust opening 50 for exhausting air is formed in the upper surface on a rear side. The air supply opening 49 and the air exhaust opening 50 are covered with filters 51 and 52, respectively. It is preferable that HEPA filters are used as the filters 51 and 52.

Figure 9:
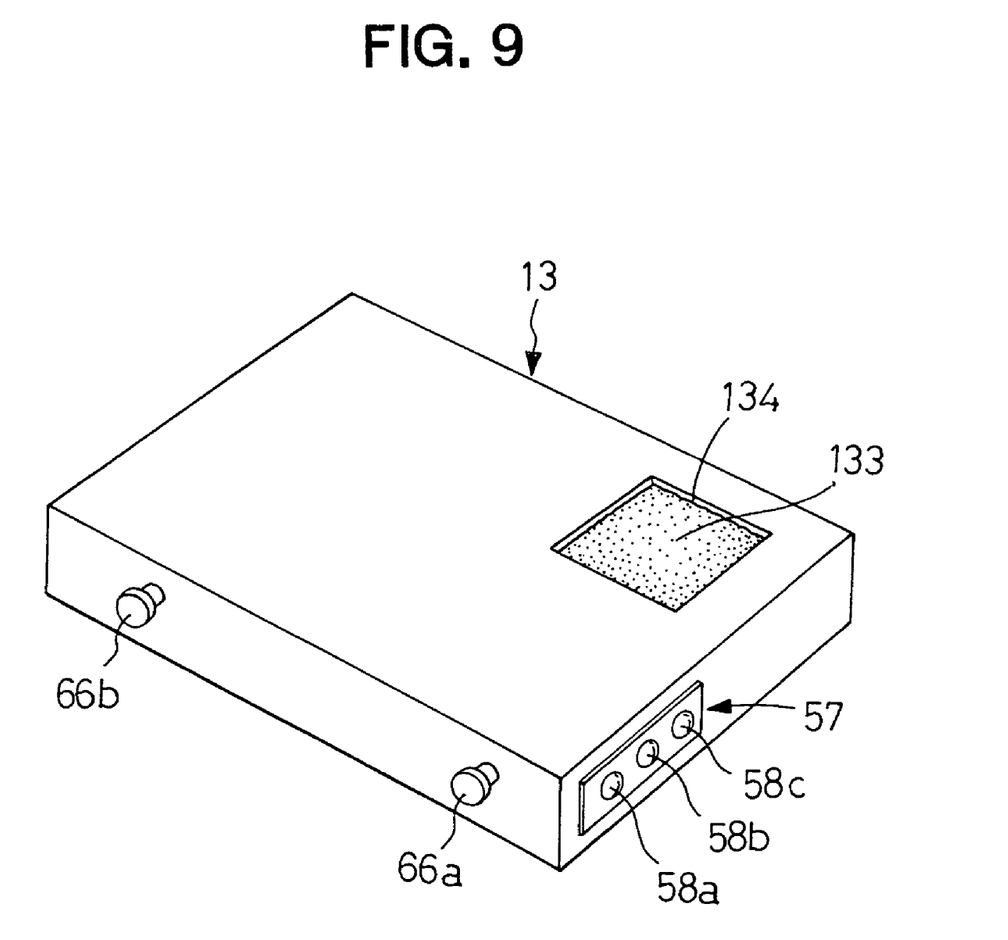
FIG. 9 A front perspective view of a fan filter unit of the laboratory animal breeding device illustrated in FIG. 8.
Figure 10:
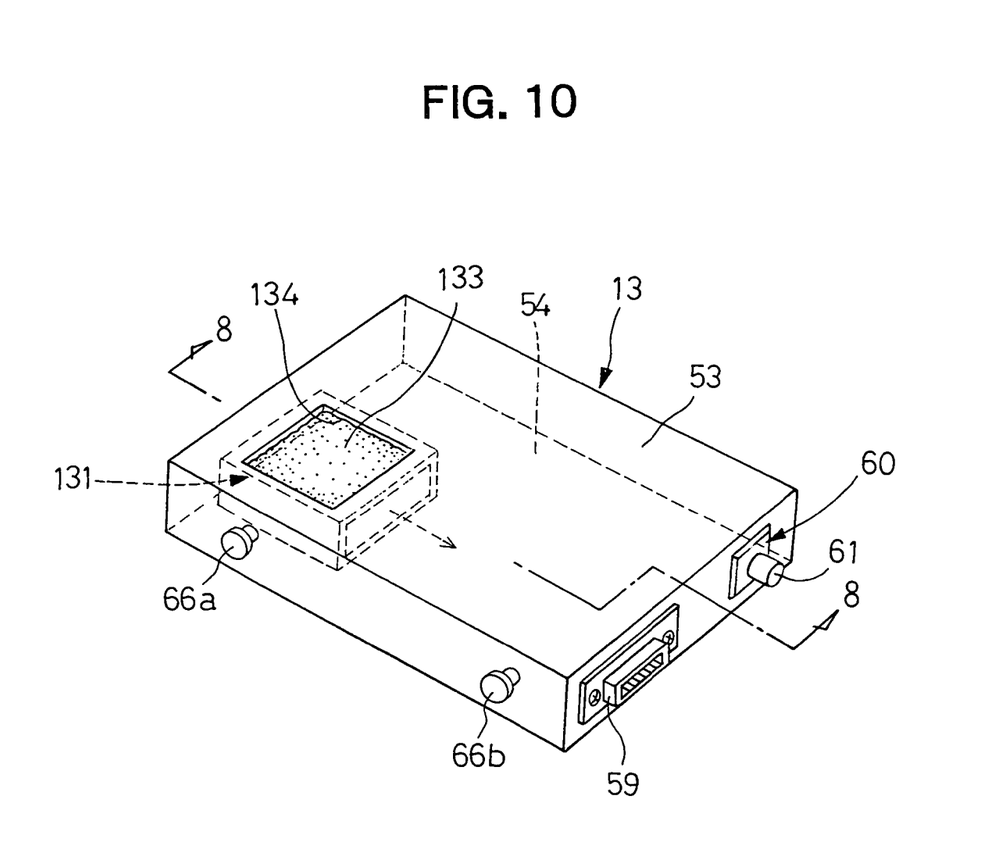
FIG. 10 A rear perspective view of the fan filter unit of the laboratory animal breeding device illustrated in FIG. 8.

The air supply device 17 is disposed over the breeding cage 8, that is, between the cover 48 of the breeding cage 8 and an upper shelf board 16 of the cage receiving portion 18 where the breeding cage 8 is placed. The air supply device 17 is formed of a fan filter unit 13. As illustrated in FIGS. 9 and 10, the fan filter unit 13 is provided with a thin sealed box (casing) 53. A fan device 131 is provided in the sealed box 53 on a front surface side. The fan device 131 is provided with a disc-shaped sirocco fan 138. An intake portion 131*a* for taking air toward a center of rotation of the fan 138 is formed over the sirocco fan 138. The intake portion 131*a* communicates in a sealed space with an air intake opening 134 formed in the casing 53 so as to oppose the intake portion 131*a*. A prefilter 133 is disposed at the air intake opening 134 of the casing 53 so as to cover the air intake opening 134.

Air blow portion 131*b* for sending air taken into the fan device 131 to a centrifugal direction of the fan 138 is formed on a side of the fan device 131 along the direction of rotation of the fan 138. The air blow portion 131*b* is formed such that air blown out from the air blow portion 131*b* goes toward a sealed chamber 54 in the casing 53. An opening 55 is formed in a bottom wall of the casing 53 which defines the sealed chamber 54 in the casing 53. A first filter 132 being a HEPA filter is disposed at the opening 55 so as to cover the opening 55. Packing 56 is securely attached to an outer surface of the bottom wall of the casing 53 so as to surround the opening 55. The packing 56 is for the purpose of making the opening 55 formed in the bottom wall of the casing 53 communicate with the air supply opening 49 formed in the upper surface of the cover 48 in an isolated state from the outside when the fan filter unit 13 is disposed over the cover 48. The packing 56 is in intimate contact with the upper surface of the cover 48 around the air supply opening 49. As is clear from this, an area where the air supply opening 49 is formed in the cover 48 of the breeding cage 8 is smaller than an area where the opening 55 is formed in the bottom wall of the casing 53.

As illustrated in FIG. 9, a display portion 57 is provided on an outer surface of the fan filter unit 13 on a front side. The display portion 57 is for the purpose of monitoring the state of operation of the fan filter unit 13, and is formed of three indicator lamps 58*a*, 58*b*, and 58*c*. The indicator lamp 58*a* is formed of an LED which emits yellow light, and lights up when driving electric power is supplied to the fan filter unit 13. The indicator lamp 58*b* is formed of an LED which emits green light, and lights up when the fan device 131 is operated. The indicator lamp 58*c* is formed of an LED which emits red light, and lights up when driving electric power is supplied to the fan filter unit 13 and the fan device 131 is not operated normally. A state where "the fan device 131 is not operated normally" includes a state where the fan device 131 stops due to failure and the like and a state where a sensor detects that the first filter 132 is clogged because the rotational torque of the fan is larger than a predetermined value or the air pressure at the air blow portion 133*b* is higher than a predetermined value.

As illustrated in FIG. 10, a connector terminal 59 and a power switch device 60 for connecting/disconnecting the connection between the fan device 131 and a power supply are provided on a rear outer surface of the fan filter unit 13. The power switch device 60 is of a push rod type. When a rod 61 protruding backward from a switch body of the power switch device 60 is depressed, driving electric power is supplied to the fan device 131. When the depressing force is released, the rod 61 protrudes due to force applied by a spring in the switch body and electric power supply to the fan device 131 is blocked.

A limit switch 62 is provided on an upper surface of a shelf board 16 in the cage receiving portion 18 of the breeding rack 5. The limit switch 62 is provided at a position where the limit switch 62 is brought into contact with the cage body 41 of the breeding cage 8 when the breeding cage 8 slides on the shelf board 16 from a front side of the breeding rack 5 to a predetermined position. An actuating device 63 of an electromagnetic solenoid type is attached to a lower surface of the upper shelf board 16 in the cage receiving portion 18 of the breeding rack 5. The actuating device 63 is operated in synchronization with the limit switch 62. To be more specific, when the limit switch 62 is turned on, the actuating device 63 is energized and a push rod 64 protrudes from the device body. When the limit switch 62 is turned off, energization of the actuating device 63 is stopped and the push rod 64 is drawn into the device body due to returning force applied by the spring in the device body.

The actuating device 63 is attached at a position where the actuating device 63 opposes an end face of the rod 61 of the power switch device 60 provided on the rear surface of the fan filter unit 13 when the unit 13 is disposed at a predetermined position over the breeding cage 8. Depressing operation of the rod 61 of the power switch device 60 is carried out at the end face.

Figure 11:
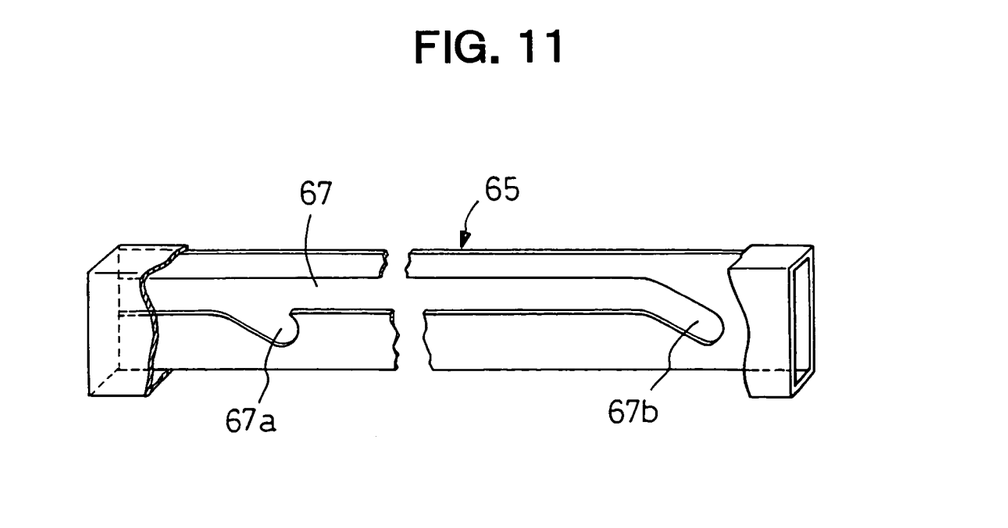
FIG. 11 A perspective view of one of a pair of mounting hardware with a part thereof omitted, the pair of mounting hardware suspending a fan filter unit from a lower surface of a shelf board of a breeding rack.

A pair of mounting hardware 65 for removably attaching the fan filter unit 13 to the lower surface of the shelf board 16 are attached to the upper surface of the shelf board 16 in the cage receiving portion 18 of the breeding rack 5 with regard to the position of each breeding cage 8. The pair of mounting hardware 65 extend from a front side to a rear side of the cage receiving portion 18, and are attached to the lower surface of the shelf board 16 with a predetermined lateral interval therebetween. As illustrated in FIG. 11, a guide slot 67 which is open at an end on the front side is formed in each of the mounting hardware 65 on a side surface opposing each other. The guide slot 67 has short slanted slots 67*a* and 67*b*.

Each of side portions of the fan filter unit 13 has two protruding portions 66*a* and 66*b* to be inserted in the guide slot 67 of the mounting hardware 65. When the fan filter unit 13 is set in a predetermined position, the short slanted slots 67a and 67b makes the protruding portions 66a and 66b move downward right before that position, and makes the fan filter unit 13 move downward such that the packing 56 attached to the lower surface of the fan filter unit 13 is brought into intimate contact with the upper surface of the cover 48 of the breeding cage 8.

A procedure for placing the breeding cage 8 and the fan filter unit 13 which is the air supply device 17 in the cage receiving portion 18 of the breeding rack 5 is as follows. First, a rear portion of the fan filter unit 13 is put between the pair of mounting hardware 65 attached to the lower surface of the shelf board 16, and the protruding portions 66a and 66b provided on both side portions of the fan filter unit 13 are inserted in the guide slots 67 of the mounting hardware 65 and are slid toward the rear side of the breeding rack 5. The slide of the fan filter unit 13 is stopped before the protruding portions 66a and 66b of the unit 13 are engaged in the slanted slots 67a and 67b.

Next, the breeding cage 8 is slid on the shelf board 16 from the front side of the breeding rack 5 into the cage receiving portion 18. When the breeding cage 8 comes to the predetermined position, its rear end portion is brought into contact with the limit switch 62 to turn on the limit switch 62 and stop the breeding cage 8 with the limit switch 62 as a stopper. When the limit switch 62 is turned on, the actuating device 63 is energized and the push rod 64 protrudes toward the rear portion of the fan filter unit 13. When the fan filter unit 13 which is temporarily stopped is slid further to the rear side of the breeding rack 5, the protruding portions 66a and 66b engage with the slanted slots 67a and 67b, the fan filter unit 13 slightly goes downward, and the packing 56 is brought into intimate contact with the upper surface of the cover 12 of the breeding cage 8. At the same time, the connector terminal 59 attached to the rear portion of the fan filter unit 13 for connection to the power supply is inserted into a plug (not shown) fixed to the lower surface of the shelf board 16. As a result, the indicator lamp 58a (yellow) of the display portion 57 lights up. Further, at the same time, the push rod 64 of the actuating device 63 depresses the rod 61 of the power switch device 60 provided on the rear surface of the fan filter unit 13, and thus, the fan device 131 of the fan filter unit 13 begins to move and the indicator lamp 58a (green) of the display portion 57 lights up. Air in the laboratory animal breeding room 1 is taken in from the air intake portion 131a to be sent to the sealed space 54 in the casing 53. Air from the sealed space 54 is cleaned through the first filter 132 and the filter 51 provided at the air supply opening 49 of the upper surface of the cover 12 and is supplied to the inside of the breeding cage 8. Air exhausted from the inside of the breeding cage 8 is cleaned through the filter 52 and exhausted from the air exhaust opening 50 to the cage receiving portion 18, and is exhausted from the exhaust opening 9 formed in the rear plate of the breeding rack 5 to the air exhaust chamber 4 in the air exhaust box 19.

When a laboratory animal in the breeding cage 8 is taken out of the breeding cage 8 to make various kinds of examinations or treatments, the fan filter unit 13 is slightly drawn forward to be floated from the upper surface of the cover 12 of the breeding cage 8. Here, the connector terminal 59 on the rear surface of the fan filter unit 13 is withdrawn from the fixed plug, so the fan device 131 stops. At the same time, the depressing force applied to the rod 61 of the power switch device 60 on the rear surface of the fan filter unit 13 is released, the power switch device 60 is turned off. After that, only the breeding cage 8 is drawn out from the cage receiving portion 18. As a result, the limit switch 62 is turned off, electric power supply to the actuating device 63 is blocked, and the push rod 64 is drawn into the device body. Next, the fan filter unit 13 is returned to the initial predetermined position. Here, the connector terminal 59 is inserted into the fixed plug again. However, since the push rod 64 of the actuating device 63 is drawn into the device body, the rod 61 of the switch device 60 is not depressed, so the fan filter unit 13 is not actuated. In other words, the fan device 131 of the fan filter unit 13 is not actuated when the breeding cage 8 does not exist in the cage receiving portion 18. At the display portion 57, only the yellow indicator lamp 58a lights up and the indicator lamp 58b (green) and the indicator lamp 58c (red) stay out. Which of the indicator lamps 58a, 58b, and 58c lights up and stays out in what state is controlled by a controlling portion (not shown) attached to an electric circuit portion formed of a printed circuit board and the like connected to the connector terminal 59 in the casing 53 through detection of energization or non-energization of the respective portions or through input signals from respective sensors.

It is to be noted that the laboratory animal breeding device 20 according to the embodiment illustrated in FIG. 8 is provided with means (not shown) for interconnecting the breeding cage 8 taken out from the breeding rack 5 and the fan filter unit 13 and a manual switch (not shown) which can supply electric power to the fan device 131 without going through the power switch device 60. Therefore, when the breeding cage 8 is taken out of the cage receiving portion 18 of the breeding rack 5 to transfer the breeding cage to some other place, the fan filter unit 13 is put on the cover 42 of the breeding cage 8 and the two are interconnected. When the manual switch is turned on after a battery mounted on a transferring device and the connector terminal 59 of the fan filter unit 13 are connected to each other, ventilation inside the breeding cage 8 can be provided by operating the fan filter unit 13 even when the breeding cage 8 is transferred.

In the laboratory animal breeding device 20 according to the embodiments of the present invention, a battery can be integrated in the fan filter unit 13. By integrating the battery in the fan filter unit 13, the fan filter unit 13 can be operated with the fan filter unit fixed on the cover of the breeding cage, and thus, the breeding cage can be carried in a ventilated state without using a dedicated transferring device.

Further, with the laboratory animal breeding device 20 according to the embodiments of the present invention, it is also preferable that a variable resistor (not shown) is attached to a power supply circuit of the fan filter unit 13 and an adjustment knob of the variable resistor is provided on a front surface of the fan filter unit 13. If such a variable resistor is provided in the fan filter unit 13, voltage supplied to the fan device 131 can be easily changed with the adjustment knob, and thus, the quantity of air can be controlled by controlling the rotation of the fan and optimal breeding environment can be obtained with regard to each breeding cage.

The embodiments described above are the best mode for carrying out the present invention, and the present invention is not limited thereto. Various modifications are possible without departing from the gist of the present invention.

The invention claimed is:

1. A laboratory breeding device comprising breeding cages, each of the breeding cages including a cage body, a part of the cage being opened and a removable cover for hermetically sealing the opening in the cage body, characterized in that:

an air supply device for ventilation inside the breeding cage is attached to the cover of the breeding cage, the breeding cage comprising an air exhaust device, the air supply device being formed of a fan filter unit comprising a fan device and a first filter, and the air exhaust device being formed of an air exhaust opening formed in the breeding cage and a second filter for cleaning air in the breeding cage passing through the air exhaust opening;

air outside the breeding cage is taken into the breeding cage while being cleaned by the fan filter unit, and contaminated air in the breeding cage is exhausted from the air exhaust opening through the second filter to outside of the breeding cage; and breeding racks, each of the breeding racks comprising a rack body having a plurality of horizontally extending shelf boards, the shelf boards being vertically arranged at predetermined intervals, a space between the shelf boards forming a cage receiving portion, and the breeding cages being placed in the cage receiving portion;

wherein:

the breeding rack comprises an electric power supply terminal for supplying driving electric power to the fan filter unit of the breeding cage placed in the cage receiving portion and a communication unit for transmitting the state of operation of the fan filter unit;

the breeding cage comprises a terminal and an interface connectable to the electric power supply terminal and the communication unit, respectively; and by placing the breeding cage in the cage receiving portion of the breeding rack, the terminal of the breeding cage is connected to the electric power supply terminal and the interface of the breeding cage can be electrically connected to the communication unit.

2. A laboratory animal breeding device according to claim 1, wherein:

the breeding rack comprises an air exhaust box attached to a rear surface of the rack body;

the air exhaust box has an air exhaust chamber formed therein, the air exhaust box has an exhaust opening communicating with the cage receiving portion; and the contaminated air in the breeding cage exhausted from the air exhaust opening of the breeding cage to the cage receiving portion is exhausted from the exhaust opening into the air exhaust chamber.

3. A laboratory animal breeding device according to claim 1, wherein the air supply device is removably attached to the cover of the breeding cages.

4. A laboratory animal breeding device according to claim 1, wherein the air supply device is removably attached to the shelf board of the breeding rack.

5. A laboratory animal breeding device according to claim 1 further comprising a state monitoring device for displaying a state of operation of the fan filter unit for supplying air to the breeding cage.

* * * * *